United States Patent [19]

Otani

[11] Patent Number: 5,379,160
[45] Date of Patent: Jan. 3, 1995

[54] MAGNETIC DISK DRIVE APPARATUS INCLUDING IMPROVED DECODING CIRCUIT

[75] Inventor: Kazuoki Otani, Hanamaki, Japan

[73] Assignee: Matsushita Electric Industrial Co., Ltd., Osaka, Japan

[21] Appl. No.: 156,850

[22] Filed: Nov. 24, 1993

Related U.S. Application Data

[62] Division of Ser. No. 818,893, Jan. 10, 1992, abandoned.

[30] Foreign Application Priority Data

Jan. 18, 1991 [JP] Japan .................... 3-004609

[51] Int. Cl.⁶ ................ G11B 5/09; G11B 15/12
[52] U.S. Cl. .................... 360/49; 360/51; 360/61
[58] Field of Search ............ 360/48, 49, 51, 61

[56] References Cited

U.S. PATENT DOCUMENTS

| | | | |
|---|---|---|---|
| 3,387,293 | 6/1968 | Stockebrand | 360/49 |
| 4,757,406 | 7/1988 | Stewart et al. | 360/49 |
| 4,788,685 | 11/1988 | Sako et al. | 360/49 |
| 4,805,046 | 2/1989 | Kuroki et al. | 360/49 |
| 5,047,877 | 9/1991 | Herting | 360/49 |

*Primary Examiner*—Donald Hajec
*Assistant Examiner*—Won Tae C. Kim
*Attorney, Agent, or Firm*—Stevens, Davis, Miller & Mosher

[57] ABSTRACT

A magnetic disk drive apparatus can reduce the production probability of failed sector due to the fact the a decoding start synchronization mark can not be detected in reproduction of data on a magnetic disk and can utilizes the capability of an error correction circuit sufficiently. A plurality of decoding start synchronization marks are provided in each sector of the magnetic disk and when any one of the decoding start synchronization marks can be detected, a decoding circuit can be operated.

8 Claims, 6 Drawing Sheets

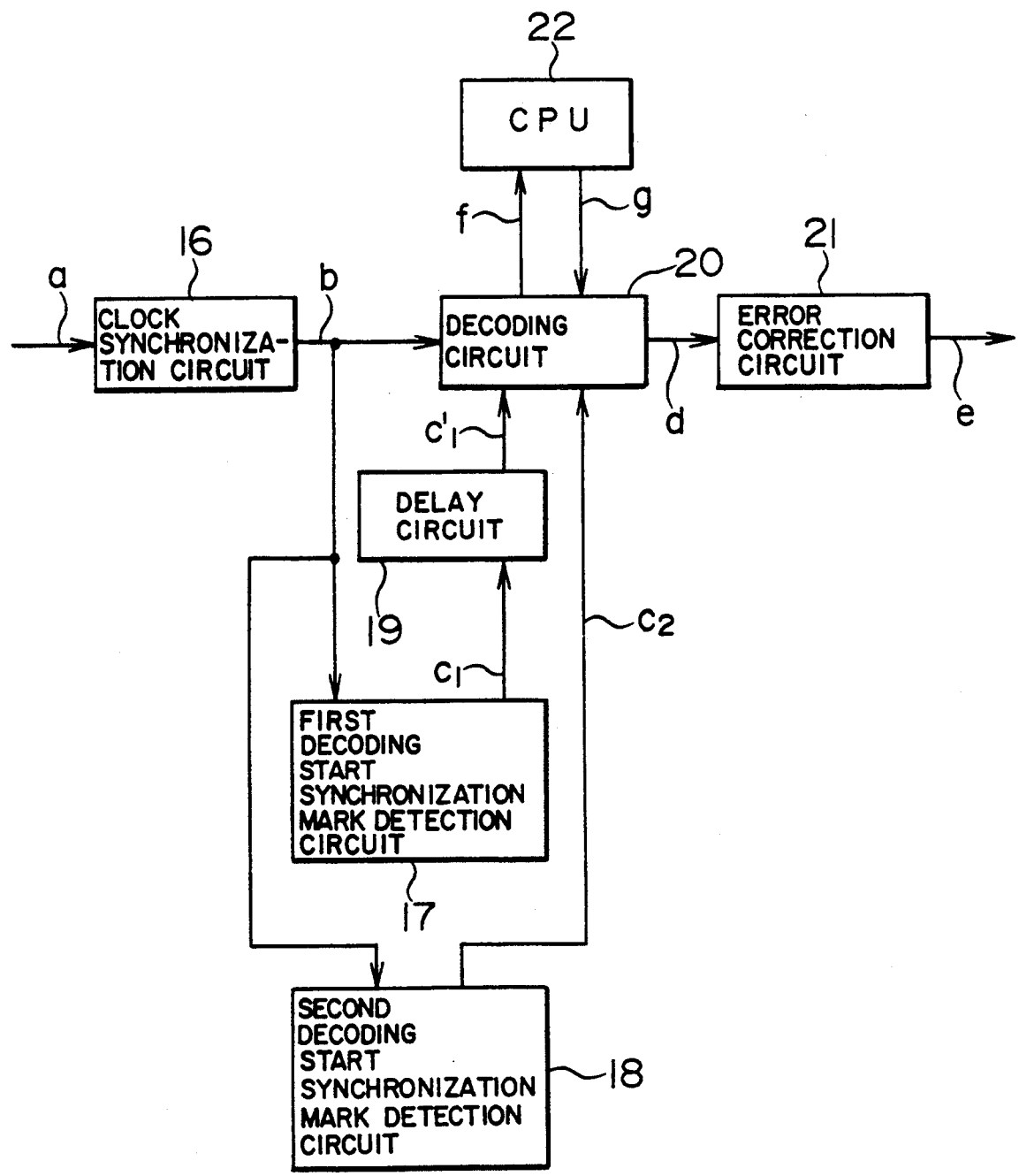

MAGNETIC DISK DRIVE APPARATUS INCLUDING IMPROVED DECODING CIRCUIT

This is a divisional of application Ser. No. 07/818,893 filed Jan. 10, 1992 abandoned.

FIELD OF THE INVENTION

The present invention relates to a magnetic disk drive apparatus such as a floppy disk apparatus and a hard disk drive apparatus for use in an external memory apparatus of a computer.

BACKGROUND OF THE INVENTION

FIG. 1 shows a format of a sector on a magnetic disk processed in a conventional magnetic disk. In FIG. 1, numeral 1 denotes a preamble pattern for clock synchronization, 2 a decoding start synchronization mark, 3 a data area and 4 error correction parity bytes. In the data area 3 and the error correction parity bytes 4, a decoding method such as (1,7) RLLC (Run Length Limited Code) or (2, 7) RLLC is used to record digital data.

FIG. 2 illustrates a configuration of a conventional magnetic disk drive apparatus. In FIG. 2, numeral 5 denotes a clock synchronization circuit, 6 a decoding start synchronization mark detection circuit, 7 a decoding circuit, and 8 an error correction circuit.

Operation of the conventional magnetic disk drive apparatus is now described. A binarized reproduction pulse a of a reproduced signal is supplied to the clock synchronization circuit 5. The clock synchronization circuit 5 establishes clock synchronization by using the clock synchronization preamble pattern 1 and produces an encoded data b. The encoded data b is supplied to the decoding start synchronization detection circuit 6 and the decoding circuit 7. When the decoding start synchronization mark detection circuit 6 detects the decoding start synchronization mark 2, the detection circuit 6 supplies a decoding start command c to the decoding circuit 7 to start decoding. The decoding circuit 7 decodes data in the data area 3 and the error correction parity bytes 4 to data in the form of NRZ (Non-Return-to-Zero) to produce decoded data d, which is supplied to the error correction circuit 8. The error correction circuit 8 corrects error in the decoded data d by means of the error correction parity bytes 4, if the decoded data contains any error, and produces reproduced data e of the data area 3.

When the clock synchronization preamble pattern 1, the decoding start synchronization mark 2, the data area 3 and the error correction parity bytes 4 have 12, 4, 512 and 32 bytes, respectively, and if an error correction code format shown in FIG. 3 is used, the error correction circuit 8 has the correction capability with respect to random error that a probability A of producing a sector having one or more errors can be improved to a probability B of producing a sector having one or more uncorrectable errors as shown in FIG. 4. Further, burst errors continuing up to 16 bytes can be corrected.

In the conventional magnetic disk drive apparatus, however, as shown in FIG. 4, a probability C of producing a sector in which the decoding start synchronization mark 2 can not be detected is larger than the probability B of producing a sector having one or more uncorrectable errors in an area of the production probability of $10^{-3}$ or less. Accordingly, since the decoding circuit 7 can not be operated before the error correction circuit 8 is operated, there is a problem that an actual probability of producing failed sectors is as shown by a broken line D and the random error correction capability of the error correction circuit 8 can not be utilized sufficiently.

Further, even if the error byte number is one byte, the error can not be corrected when the error is produced in the decoding start synchronization mark 2 and accordingly there is a problem that the burst error correction capability of the error correction circuit 8 capable of correcting the burst error having up to 16 bytes can not be utilized sufficiently.

SUMMARY OF THE INVENTION

It is an object of the present invention to provide an excellent magnetic disk drive apparatus which can reduce a probability of producing failed sector due to the fact that the decoding start synchronization mark can not be detected and utilize the random error correction capability of an error correction circuit sufficiently.

It is a second object of the present invention to provide an excellent magnetic disk drive apparatus which can prevent the decoding start synchronization mark from being not detected due to a single burst error having an error-correctable byte length or less and utilize the burst error correction capability of the error correction circuit sufficiently.

In order to achieve the above objects, according to the present invention, if any one of a plurality of decoding start synchronization marks recorded in a sector on the magnetic disk is detected, the decoding circuit can be operated.

Further, according to the present invention, if any one of the decoding start synchronization mark and a decoding end synchronization mark recorded in an end of the sector can be detected, the decoding circuit can be operated.

Thus, according to the present invention, since operation is made successfully if any one of the plurality of decoding start synchronization marks recorded in the sector of the magnetic disk is detected, the probability of producing failed sector due to the fact that the decoding start synchronization mark can not be detected can be reduced remarkably and the random error correction capability of the error correction circuit can be utilized sufficiently.

Further, according to the present invention, since the decoding start synchronization mark recorded in a front portion of the sector format and the decoding end synchronization mark recorded in a rear portion of the sector format are sufficiently separated from each other in distance, there is no possibility that both of the synchronization marks can not be detected due to a single burst error having a magnitude of error-correctable extent or less and accordingly the burst error correction capability of the error correction circuit can be utilized sufficiently.

BRIEF DESCRIPTION OF THE DRAWINGS

FIG. 3 is used with respect to the conventional FIG. 2 system;

FIG. 6 is a block diagram illustrating a configuration of the first embodiment of the present invention;

DESCRIPTION OF THE PREFERRED EMBODIMENT

Figure 1:
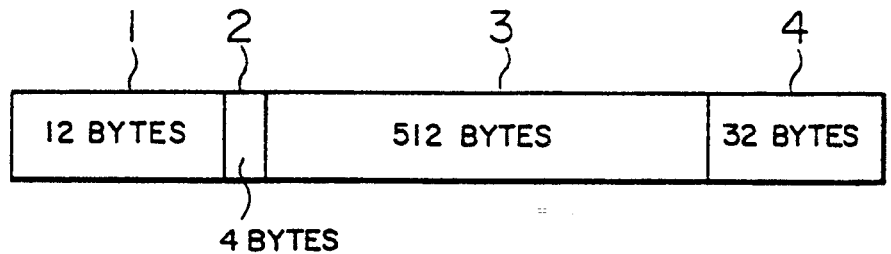
FIG. 1 shows a format of a sector on a conventional magnetic disk.
Figure 2:
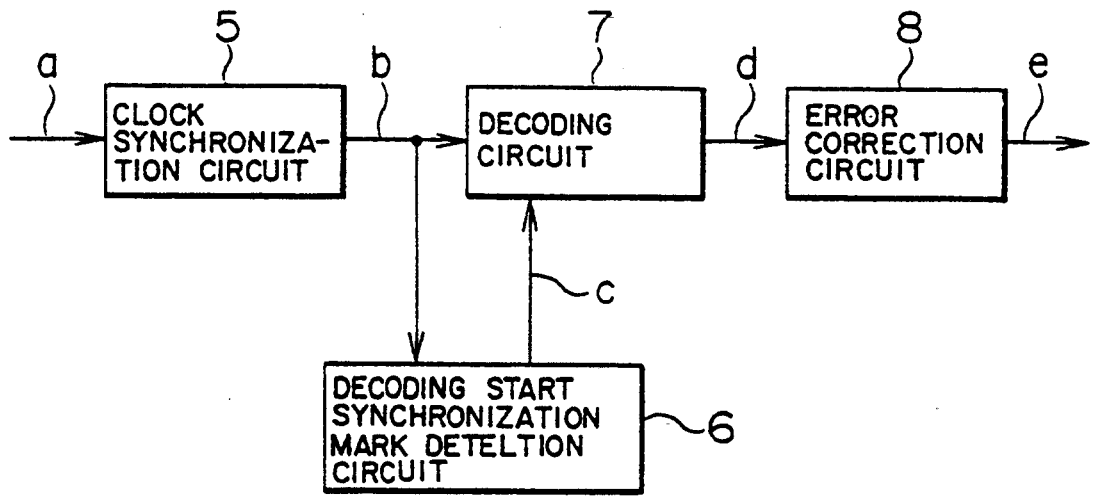
FIG. 2 illustrates a configuration of a conventional magnetic disk drive apparatus.
Figure 3:
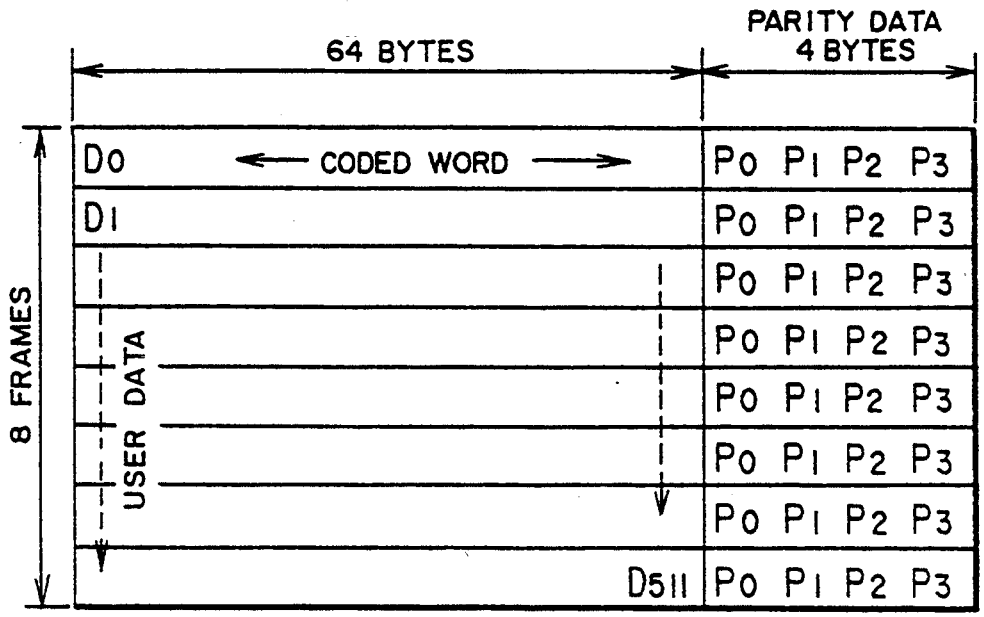
FIG. 3 shows a format of an error correction code for use with the conventional apparatus of FIG. 2.
Figure 5:
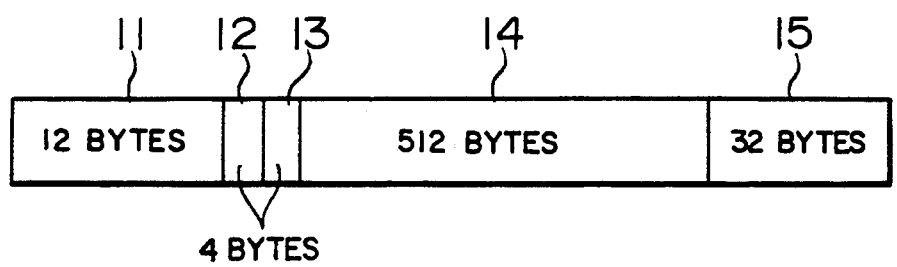
FIG. 5 shows a format of a sector of a magnetic disk in a first embodiment of the present invention.

FIG. 5 shows a format of a sector of a magnetic disk in a first embodiment of the present invention. In FIG. 5, numeral 11 denotes a clock synchronization preamble pattern having 12-byte length, 12 a first decoding start synchronization mark having 4-byte length, 13 a second decoding start synchronization mark having 4-byte length, 14 a data area having 512-byte length, and 15 an error correction parity byte having 32-byte length. The error correction parity byte 15 uses the error correction code format shown in FIG. 3. In the data area 14 and the error correction parity byte 15, a decoding method such as (1,7) RLLC (Run Length Limited Code) or (2, 7) RLLC is used to modulate and record information.

FIG. 6 is a block diagram illustrating a configuration of a portion of a magnetic disk drive apparatus according to the first embodiment of the present invention. In FIG. 6, numeral 16 denotes a clock synchronization circuit for synchronizing a reproduced pulse with a clock, 17 a first decoding start synchronization mark detection circuit for detecting the first decoding start synchronization mark, 18 a second decoding start synchronization mark detection circuit for detecting the second decoding start synchronization mark, 19 a delay circuit for delaying a decoding start command $c_1$ produced by the first decoding start synchronization mark detection circuit, 20 a decoding circuit for decoding data on the magnetic disk by means of a decoding method such as (1,7) RLLC or (2,7) RLLC, 21 an error correction circuit for correcting an error of data in the data area 14 by means of the error correction parity byte 15 and having a burst error correction capability of 16 bytes, and 22 a CPU for controlling the whole of the magnetic disk drive apparatus.

Operation of the first embodiment is now described. Data recorded on the magnetic disk is read by a reading head (not shown) to produce a reproduced signal and a binarized reproduction pulse a of the reproduced signal is supplied to the clock synchronization circuit 16. The clock synchronization circuit 16 uses the clock synchronization preamble pattern 11 to establish clock synchronization and produces an encoded data b. The encoded data b is supplied to the first and second decoding start synchronization mark detection circuit 17 and 18 and the decoding circuit 20.

When the first decoding start synchronization mark detection circuit 17 detects the first decoding start synchronization mark 12, the circuit 17 produces the decoding start command $c_1$ on the basis of the first decoding start synchronization mark 12. The decoding start command $c_1$ is delayed by the delay circuit 19 by four bytes and is supplied to the decoding circuit 20 as a decoding start command $c_1'$ to start decoding of data. A byte at the head of the data area 14 in the encoded data b is delayed by four bytes from the detection timing of the first decoding start synchronization mark 12 and can be accordingly decoded at timing of the decoding start command $c_1'$ delayed by four bytes.

Even if the first decoding start synchronization mark 12 can not be detected due to any error, the second decoding start synchronization mark circuit 18 detects the second decoding start synchronization command $c_2$ and produces a decoding start command $c_2$ on the basis of the second decoding start synchronization mark to supply it to the decoding circuit 20 to start decoding.

The decoding circuit 20 decodes data in the data area 14 and the error correction parity byte 15 to data in the form of NRZ (Non-Return-to-Zero) to produce decoded data d and supplies the decoded data d to the error correction circuit 21. The error correction circuit 21 corrects the decoded data d by means of the error correction parity byte 15, if the decoded data contains any error, and produces reproduced data e in the data area 14.

Further, when the first and second decoding start synchronization marks 12 and 13 are both detected, the decoding start command $c_1$ on the basis of the delayed first decoding start synchronization mark 12 and the decoding start command $c_2$ on the basis of the second decoding start synchronization mark 13 are supplied to the decoding circuit 20 simultaneously. The decoding circuit 20 starts decoding when the commands $c_1$ and $c_2$ are supplied to the decoding circuit 20 simultaneously or when any one of the commands $c_1$ and $c_2$ is supplied to the circuit 20. In this case, one of the commands $c_1$ and $c_2$ is supplied to the circuit 20 after only the other of the commands $c_1$ and $c_2$ has been supplied to the circuit 20, detection in the first or second decoding start synchronization mark detection circuit 17 or 18 is error and accordingly the decoding circuit 20 informs the CPU 22 of an error report f. When the decoding start command supplied precedently to the decoding circuit 20 is based on erroneous detection, the error correction circuit 21 can not correct the error and accordingly the CPU 22 retries the series of operations. At this time, since the decoding start command supplied precedently to the decoding circuit 20 is based on the erroneous detection, the CPU 22 produces a command g to conform to the decoding start command supplied subsequently to the decoding circuit 20.

Figure 4:
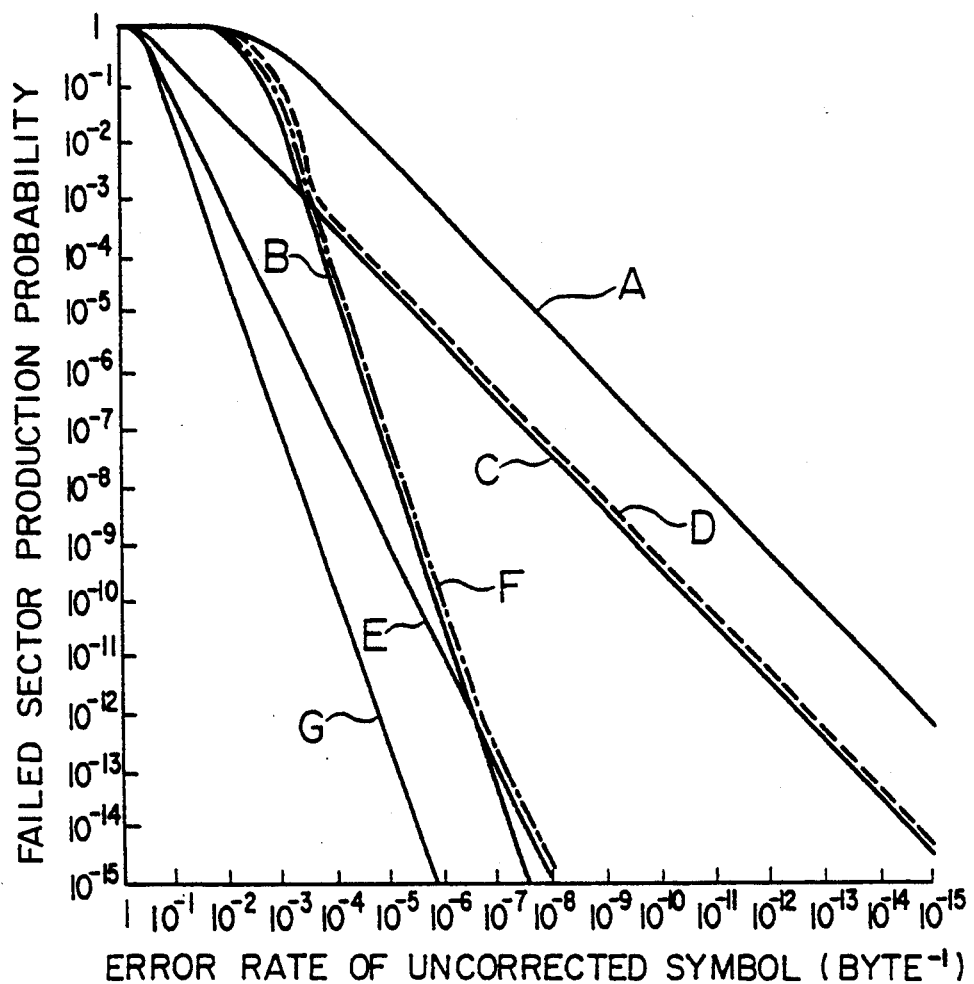
FIG. 4 is a graph showing a failed sector production probability when the error correction code

As described above, according to the first embodiment, since operation is made successfully if any one of the first and second decoding start synchronization marks 12 and 13 is detected, the production probability of failed sector due to the fact that the decoding start synchronization mark can not be decoded is equal to the production probability E of sector in the case where both of two provided decoding start synchronization marks can not be detected, as shown in FIG. 4. Accordingly, the production probability of failed sector in the embodiment is remarkably improved as shown by one-dot chain F of FIG. 4 and the random error correction capability of the error correction circuit 21 can be utilized sufficiently. Further, since it is not necessary to delay the encoded data b differently from a second embodiment described later, the throughput of the apparatus is not reduced.

In the embodiment, the decoding start synchronization marks 12 and 13 are provided successively in the sector format, while the marks may be provided separately from each other and two or more marks may be provided.

Figure 7:
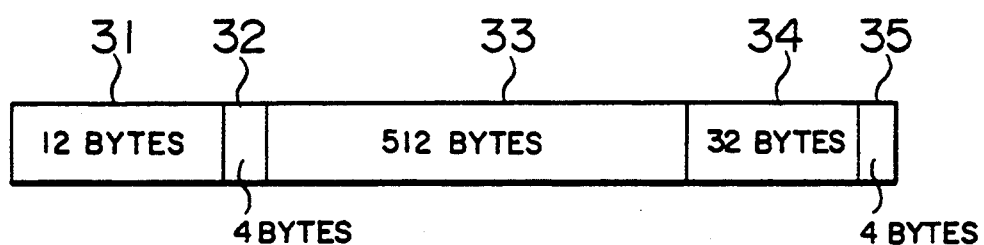
FIG. 7 shows a format of a sector of a magnetic disk in a second embodiment of the present invention.

FIG. 7 shows a format of a sector of a magnetic disk in a second embodiment of the present invention. In FIG. 7, numeral 31 denotes a clock synchronization preamble pattern having 12-byte length, 32 a decoding start synchronization mark having 4-byte length, 33 a data area having 512-byte length, 34 an error correction parity byte having 32-byte length, and 35 a decoding end synchronization mark having 4-byte length. The error correction parity byte 34 uses the error correction code format shown in FIG. 3. In the data area 33 and the error correction parity byte 34, a decoding method such as (1,7) RLLC (Run Length Limited Code) or (2, 7) RLLC is used to modulate and record information.

Figure 8:
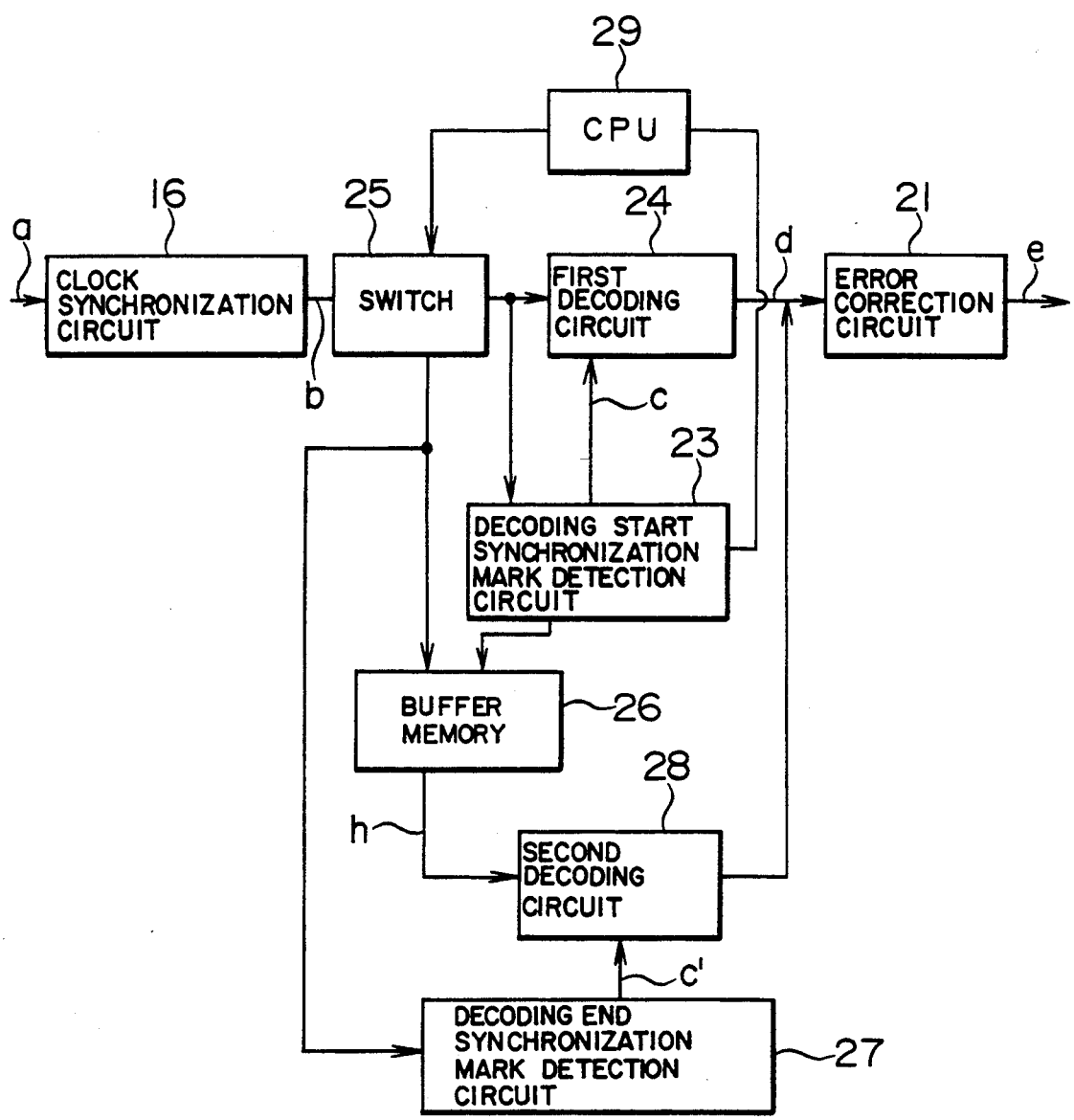
FIG. 8 is a block diagram illustrating a configuration of the second embodiment of the present invention.

FIG. 8 is a block diagram illustrating a configuration of a portion of a magnetic disk drive apparatus according to the second embodiment of the present invention. In FIG. 8, description of the same elements as those of the first embodiment is omitted. In FIG. 8, numeral 23 denote a decoding start synchronization mark detection circuit, 24 and 28 first and second decoding circuits, respectively, 25 a switch, 26 a buffer memory, 27 a decoding end synchronization mark detection circuit, and 29 a CPU for controlling the whole of the magnetic disk drive apparatus.

Operation of the second embodiment is now described. Normally, the switch 25 is set so that an output of the clock synchronization circuit 16 is supplied to the decoding start synchronization mark detection circuit 23 and the first decoding circuit 24. When a binarized reproduction pulse a of the reproduced signal is supplied to the clock synchronization circuit 16, the clock synchronization circuit 16 establishes clock synchronization by means of the clock synchronization preamble pattern 31 and produces an encoded data b. The encoded data b is supplied to the decoding start synchronization mark detection circuit 23 and the first decoding circuit 24. When the detection circuit 23 detects the decoding start synchronization mark 32, the detection circuit 23 supplies a decoding start command c to the first decoding circuit 24 to start decoding. The first decoding circuit 24 decodes data in the data area 33 and the error correction parity byte 34 to data in the form of NRZ to produce a decoded data d and supplies the decoded data d to the error correction circuit 21. The error correction circuit 21 corrects the decoded data d by means of the error correction parity byte 34, if the decoded data contains any error, and produces the reproduced data e in the data area 33.

When the decoding start synchronization mark 32 can not be detected due to any error, the decoding start synchronization mark detection circuit 23 inform the CPU 29 of the fact that the mark 32 can not be detected. Thus, the CPU 29 controls the switch 25 to connect the clock synchronization circuit 16 to the buffer memory 26 and the decoding end synchronization mark detection circuit 27. Accordingly, the encoded data b is supplied to the buffer memory 26 and the decoding end synchronization mark detection circuit 27. The buffer memory 26 delays the encoded data b by 548 bytes (512 bytes of the data area + 32 bytes of the error correction parity byte + 4 bytes of the decoding end synchronization mark) and supplies the delayed encoded data h to the second decoding circuit 28. When the decoding end synchronization mark detection circuit 27 detects the decoding end synchronization mark 35, the detection circuit 27 supplies a decoding start command c' to the second decoding circuit 28 to start decoding. The byte at the head of the encoded data b is advanced by 548 bytes with respect to the detection timing of the decoding end synchronization mark 35. Accordingly, the encoded data h delayed by 548 bytes can be decoded at the detection timing of the decoding end synchronization mark 35. The second decoding circuit 28 decodes data in the data area 33 and the error correction parity byte 34 to data in the form of NRZ to produce the decoded data d and supplies the decoded data to the error correction circuit 21. The error correction circuit 21 corrects the decoded data d by means of the error correction parity byte 34, if the decoded data contains any error, and produces the reproduced date e of the data area 33.

In this manner, according to the second embodiment, since operation is made successfully if any one of the decoding start synchronization mark 32 and the decoding end synchronization mark 35 is detected, the production probability of failed sector due to the fact that the synchronization marks can not be decoded is equal to the production probability E of sector in the case where both of two provided synchronization marks can not be detected, as shown in FIG. 4. Accordingly, the production probability of failed sector in the embodiment is remarkably improved as shown by one-dot chain line F of FIG. 4 and the random error correction capability of the error correction circuit 21 can be utilized sufficiently.

Since the decoding start synchronization mark 32 recorded in the front portion of the sector format and the decoding end synchronization mark 35 recorded in the rear portion of the sector format are separated from each other by 544 bytes, there is no case where both of the synchronization marks can not be detected due to a single burst error of 16 bytes or less which can be corrected and accordingly the burst error correction capability of the error correction circuit 21 can be utilized sufficiently.

In the second embodiment, the first decoding circuit 24 may be used to have the function of the second decoding circuit 28. Further, since the buffer memory 26 is used only when the decoding start synchronization mark 32 can not be detected, a memory such as a track buffer which is normally used for other purpose may be used for the buffer memory 26. Two or more decoding start synchronization marks 32 and two or more decoding end synchronization marks 35 may be provided.

Figure 9:
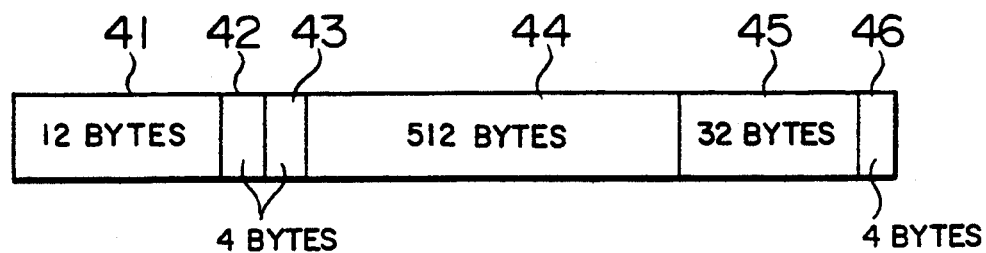
FIG. 9 shows a format of a sector of a magnetic disk in a third embodiment of the present invention.

FIG. 9 shows a format of a sector of a magnetic disk in a third embodiment of the present invention. In FIG. 9, numeral 41 denotes a clock synchronization preamble pattern having 12-byte length, 42 a first decoding start synchronization mark having 4-byte length, 43 a second decoding start synchronization mark having 4-byte length, 44 a data area having 512-byte length, 45 an error correction parity byte having 32-byte length, and 46 a decoding end synchronization mark having 4-byte length. The error correction parity byte 45 uses the error correction code format shown in FIG. 3. In the data area 44 and the error correction parity byte 45, a decoding method such as (1,7) RLLC (Run Length Limited Code) or (2, 7) RLLC is used to modulate and record information.

Figure 10:
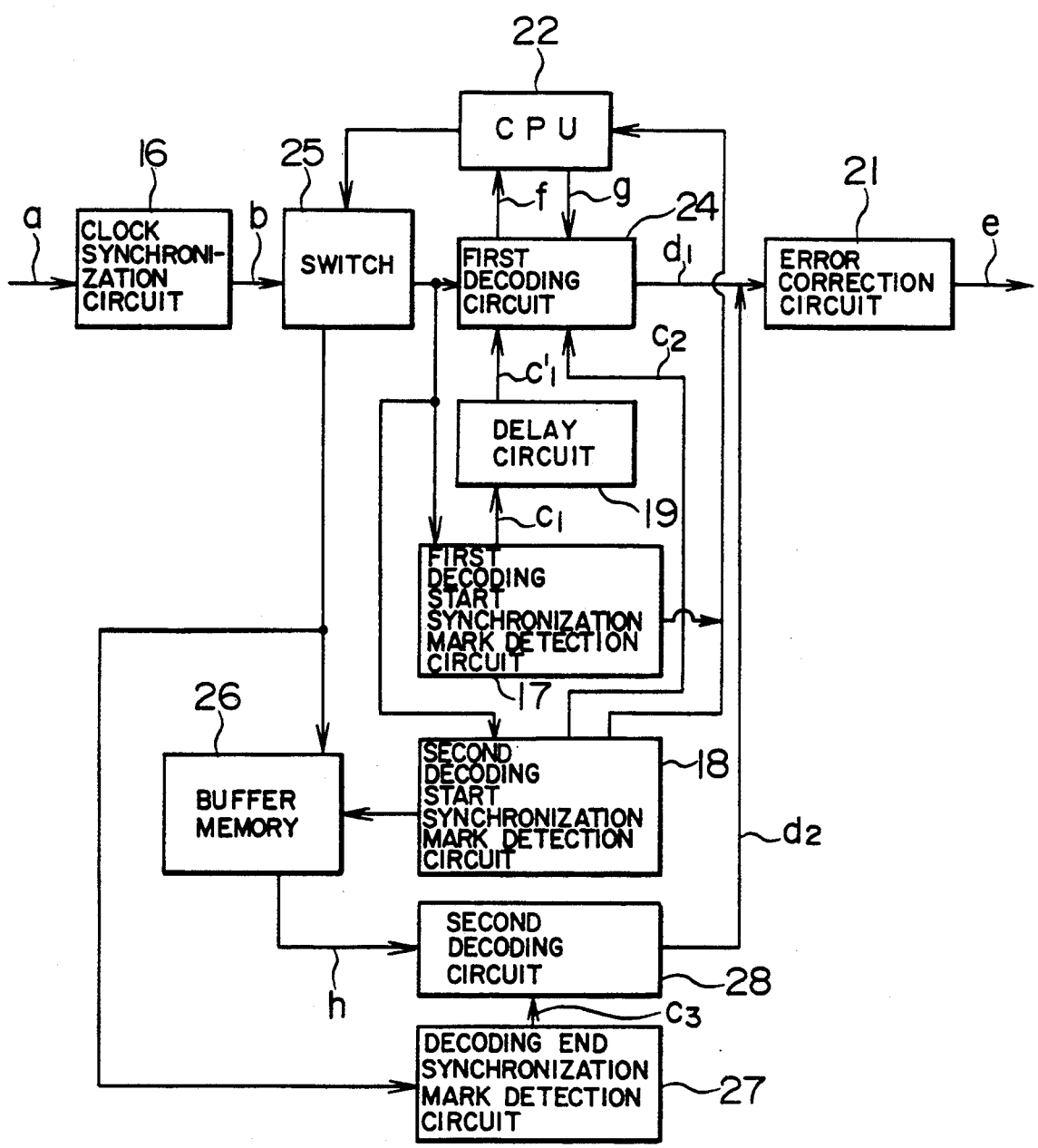
FIG. 10 is a block diagram illustrating a configuration of the third embodiment of the present invention.

FIG. 10 is a block diagram illustrating a configuration of a portion of the third embodiment of the present invention. Elements shown in FIG. 10 are those described in the first and second embodiments and the third embodiment is a combination of the first and second embodiments.

Operations of the third embodiment is now described. The switch 25 is set so that an output of the clock synchronization circuit 16 is supplied to the first decoding start synchronization mark detection circuit 17, the second decoding start synchronization mark detection circuit 18 and the first decoding circuit 24. The binarized reproduction pulse a of the reproduced signal is supplied to the clock synchronization circuit 16. The clock synchronization circuit 16 establishes clock synchronization by means of the clock synchronization preamble pattern 41 and produces the encoded data b. The encoded data b is supplied to the first decoding start synchronization mark detection circuit 17, the second decoding start synchronization mark detection circuit 18 and the first decoding circuit 24. The first decoding start synchronization mark detection circuit 17 detects the first decoding start synchronization mark 42 to produce the decoding start command $c_1$ on the basis of the first decoding start synchronization mark. The decoding start command $c_1$ is delayed by the delay circuit 19 by four-byte timing and the delayed decoding start command is supplied to the first decoding circuit 24 as the decoding start command $c_1'$ to start decoding. Since the byte at the head of the encoding data b is delayed by four bytes with respect to the detection timing of the first decoding start synchronization mark 42, decoding can be made at the timing of the decoding start command $c_1'$ delayed by four bytes.

Even when the first decoding start synchronization mark 42 can not be detected due to any error, the second decoding start synchronization mark detection circuit 18 detects the second decoding start synchronization mark 43 and the decoding start command $c_2$ on the basis of the second decoding start synchronization mark is supplied to the first decoding circuit 24 to start decoding.

Then, the first decoding circuit 24 decodes data in the data area 44 and the error correction parity byte 45 to data in the form of NRZ to produce the decoded data d and supplied the decoded data to the error correction circuit 21. The error correction circuit 21 corrects the decoded data d on the basis of the error correction parity byte 45, if the decoded data contains any error, and produces the reproduced data e of the data area 44.

Further, when the first and second decoding start synchronization marks 42 and 43 are both detected, the decoding start command $c_1'$ on the basis of the delayed first decoding start synchronization mark 42 and the decoding start command $c_2$ on the basis of the second decoding start synchronization mark 43 are supplied to the first decoding circuit 24 simultaneously. The first decoding circuit 24 starts decoding when the commands $c_1'$ and $c_2$ are supplied to the circuit 24 simultaneously or when any one of the commands $c_1'$ and $c_2$ is supplied to the circuit 24. In this case, when one of the commands $c_1'$ and $c_2$ is supplied to the circuit 24 after only the other of the commands $c_1'$ and $c_2$ has been supplied to the circuit 24, detection in the first or second decoding start synchronization mark detection circuit 17 or 18 is error and accordingly the first decoding circuit 24 informs the CPU 22 of an error report f. When the decoding start command supplied precedently to the first decoding circuit 24 is based on erroneous detection, the error correction circuit 21 can not correct the error and accordingly the CPU 22 retries the series of operations. At this time, since the decoding start command supplied precedently to the first decoding circuit 24 is based on the erroneous detection, the CPU 22 produces a command Z to conform to the decoding start command supplied subsequently to the first decoding circuit 24.

When both of the first and second decoding start synchronization marks 42 and 43 can not be detected due to any error, the first and second decoding start synchronization mark detection circuits 17 and 18 inform the CPU 22 of the fact that both of the marks can not be detected. Thus, the CPU 22 controls the switch 25 to connect the clock synchronization circuit 16 to the buffer memory 26 and the decoding end synchronization mark detection circuit 27. Accordingly, the encoded data b is supplied to the buffer memory 26 and the decoding end synchronization mark detection circuit 27. Then, the buffer memory 26 delays the encoded data b by 548 bytes (4 bytes of the decoding end synchronization mark+512 bytes of the data area+32 bytes of the error correction parity byte) and supplies the delayed encoded data h to the second decoding circuit 28. When the decoding end synchronization mark detection circuit 27 detects the decoding end synchronization mark 46, the detection circuit 27 supplies the decoding start command $c_3$ to the second decoding circuit 28 to start decoding. The byte at the head of the encoded data b is advanced by 548 bytes with respect to the detection timing of the decoding end synchronization mark 46. Accordingly, the encoded data h delayed by 548 bytes can be decoded at the detection timing of the decoding end synchronization mark 46. The second decoding circuit 28 decodes data in the data area 44 and the error correction parity byte 45 to data in the form of NRZ to produce the decoded data $d_2$ and supplies the decoded data to the error correction circuit 21. The error correction circuit 21 corrects the decoded data $d_2$ by means of the error correction parity byte 45, if the decoded data contains any error, and produces the reproduced date e of the data area 44.

In this manner, according to the third embodiment, since operation is made successfully if any one of the first decoding start synchronization mark 42, the second decoding end synchronization mark 43 and the decoding end synchronization mark 46 is detected, the production probability of failed sector due to the fact that the synchronization marks can not be decoded is equal to the production probability G of sector in the case where all of three provided synchronization marks can not be detected, as shown in FIG. 4. Accordingly, the production probability of failed sector in the embodiment is coincident with the production probability B of sector which contains one or more uncorrectable errors and the random error correction capability of the error correction circuit 21 can be utilized sufficiently.

Since the decoding end synchronization mark 46 is used, the encoded data b is not delayed, and even when only the first and second decoding start synchronization marks 42 and 43 are used, the production probability of failed sector is extremely improved as shown by one-dot chain line F of FIG. 4. Accordingly, the random error correction capability of the error correction circuit 21 can be utilized sufficiently without reduction of the throughput of the apparatus.

Since the second decoding start synchronization mark 43 recorded in the front portion of the sector format and the decoding end synchronization mark 46 recorded in the rear portion of the sector format are separated from each other by 544 bytes, there is no case where both of the synchronization marks can not be detected due to a single burst error of 16 bytes or less which can be corrected and accordingly the burst error correction capability of the error correction circuit 21 can be utilized sufficiently.

I claim:

1. A magnetic disk drive apparatus comprising:
   means for detecting a decoding start synchronization mark indicative of a decoding start position of a series of reproduced data modulated by means of a decoding method and recorded in each sector of a magnetic disk;
   means for detecting a decoding end synchronization mark indicative of a decoding end position of the series of reproduced data recorded in each sector of the magnetic disk;
   means for decoding desired data when any one of said decoding start synchronization mark or said decoding end synchronization mark is detected; and
   switch means for supplying the series of reproduced data to said means for detecting said decoding end synchronization mark when said decoding start synchronization mark can not be detected.

2. A magnetic disk drive apparatus according to claim 1, wherein said decoding method is (1, 7) RLLC (Run Length Limited Code).

3. A magnetic disk drive apparatus according to claim 1, wherein said decoding method is (2, 7) RLLC (Run Length Limited Code).

4. A magnetic disk drive apparatus according to claim 1, comprising means for correcting an error contained in the decoded data.

5. A magnetic disk drive apparatus comprising:
   means for detecting a decoding start synchronization mark indicative of a decoding start position of a series of reproduced data modulated by means of a decoding method and recorded in each sector of a magnetic disk;
   means for detecting a decoding end synchronization mark indicative of a decoding end position of the series of reproduced data recorded in each sector of the magnetic disk;
   first decoding means for decoding desired data when said decoding start synchronization mark is detected; and
   second decoding means for decoding desired data when said decoding end synchronization mark is detected.

6. A magnetic disk drive apparatus according to claim 5, comprising switch means for supplying the series of reproduced data to said means for detecting said decoding end synchronization mark when said decoding start synchronization mark can not be detected.

7. A magnetic disk drive apparatus according to claim 5, comprising means for correcting an error contained in the decoded data.

8. A magnetic disk drive apparatus comprising:
   means for detecting a plurality of decoding start synchronization marks indicative of a decoding start position of a series of reproduced data modulated by means of a decoding method and recorded in each sector of a magnetic disk;
   means for detecting a decoding end synchronization mark indicative of a decoding end position of the series of reproduced data recorded in each sector of the magnetic disk;
   means for decoding desired data when any one of said plurality of decoding start synchronization mark or said decoding end synchronization mark is detected; and
   switch means for supplying the series of reproduced data to said means for detecting said decoding end synchronization mark when said decoding start synchronization mark can not be detected.

* * * * *